US011157599B2

(12) United States Patent
Zhou et al.

(10) Patent No.: US 11,157,599 B2
(45) Date of Patent: Oct. 26, 2021

(54) MASKED WATERMARKS AND RELATED SYSTEMS AND TECHNIQUES

(71) Applicant: Citrix Systems, Inc., Fort Lauderdale, FL (US)

(72) Inventors: Fuping Zhou, Nanjing (CN); Yeping Liu, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/663,971

(22) Filed: Oct. 25, 2019

(65) Prior Publication Data

US 2021/0056183 A1 Feb. 25, 2021

Related U.S. Application Data

(63) Continuation of application No. PCT/CN2019/101539, filed on Aug. 20, 2019.

(51) Int. Cl.
*G06F 21/16* (2013.01)

(52) U.S. Cl.
CPC ...... *G06F 21/16* (2013.01); *G06F 2221/0733* (2013.01)

(58) Field of Classification Search
CPC .................. G06F 21/16; G06F 2221/0733
See application file for complete search history.

(56) References Cited

U.S. PATENT DOCUMENTS

| 7,254,250 B2 | 8/2007 | Seroussi |
| 7,451,317 B2 | 11/2008 | Oh et al. |
| 9,449,250 B1 * | 9/2016 | Cherry ............... H04N 1/00838 |

| 2002/0085736 A1 | 7/2002 | Kalker et al. |

(Continued)

FOREIGN PATENT DOCUMENTS

| CN | 101493928 A | 7/2009 |
| EP | 1 231 767 A2 | 8/2002 |

(Continued)

OTHER PUBLICATIONS

Maciej Piec • Andreas Rauber; Real-Time Screen Watermarking Using Overlaying Layer; 2014 Ninth International Conference on Availability, Reliability and Security (pp. 561-570); (Year: 2014).*

(Continued)

*Primary Examiner* — Luu T Pham
*Assistant Examiner* — Chao Wang
(74) *Attorney, Agent, or Firm* — Daly, Crowley, Mofford & Durkee, LLP

(57) ABSTRACT

Techniques are disclosed for rendering a watermark on content in a manner as to not obfuscate or otherwise cause visual defects to data elements in the content. An example methodology implementing the techniques includes segmenting a watermark to be rendered on the content into multiple watermark pieces. Then, prior to rendering a particular watermark piece, a check is made to determine whether there is a data element at the location in the content at which the particular watermark piece is to be rendered. If a data element is detected at that location, the particular watermark piece is rendered such that the data element overlays the particular watermark piece to render the watermark as a masked watermark. Otherwise, if no data element is detected at that location, the watermark piece is rendered on the content to be visible. The process is repeated to render the remaining watermark pieces.

21 Claims, 10 Drawing Sheets

(56) References Cited

U.S. PATENT DOCUMENTS

| | | | |
|---|---|---|---|
| 2005/0152458 A1 | 7/2005 | Tanaka | |
| 2006/0107056 A1 | 5/2006 | Bhatt et al. | |
| 2007/0177759 A1* | 8/2007 | Eschbach | H04N 1/32325 382/100 |
| 2009/0060261 A1* | 3/2009 | Wang | G06T 1/0028 382/100 |
| 2010/0169652 A1 | 7/2010 | Butler | |
| 2016/0344891 A1* | 11/2016 | Eschbach | G06K 15/02 |
| 2016/0352961 A1 | 12/2016 | Eschbach et al. | |
| 2019/0164322 A1 | 5/2019 | Kong et al. | |

FOREIGN PATENT DOCUMENTS

| | | |
|---|---|---|
| JP | 2016220200 A | 12/2016 |
| WO | WO 2004/023472 | 3/2004 |
| WO | WO 2012/106245 | 8/2012 |

OTHER PUBLICATIONS

Petrovic, R. • Winograd, J. • Jian Zhao; Watermark screening in networked environment; 2011 10th International Conference on Telecommunication in Modern Satellite Cable and Broadcasting Services (TELSIKS) (vol. 1, pp. 53-60); (Year: 2011).*

J. Nin • S. Ricciardi; Digital Watermarking Techniques and Security Issues in the Information and Communication Society; 2013 27th International Conference on Advanced Information Networking and Applications Workshops (pp. 1553-1558); (Year: 2013).*

Search Report of the ISA dated May 18, 2020 for International Application No. PCT/CN2019/101539; 6 Pages.

Written Opinion of the ISA dated May 18, 2020 for International Application No. PCT/CN2019/101539; 4 Pages.

Australian Exam Report dated Sep. 23, 2020 for Australian Application No. 2019430941; 6 Pages.

Extended European Search Report dated Jan. 13, 2021 for European Application No. EP19923711.6; 6 pages.

Australian Examination Report No. 2 dated Nov. 25, 2020 for Australian Application No. 2019430941; 4 pages.

Canadian Office Action dated Nov. 4, 2020 for Canadian Application No. 3,090,523; 8 pages.

Japanese Office Action (with English Translation) dated Jun. 8, 2021 for Japanese Application No. 2020-544859; 9 pages.

* cited by examiner ns and Related Systems and Techniques

CROSS REFERENCE TO RELATED APPLICATION

This application is a continuation of and claims the benefit of PCT Patent Application No. PCT/CN2019/101539 filed on Aug. 20, 2019 in the English language in the State Intellectual Property Office and designating the United States, the contents of which are hereby incorporated herein by reference in its entirety.

BACKGROUND

Digital watermarking is a widely-used technique for marking and/or protecting digital content including images, text, documents or other forms of digital data which may appear on a display. Digital watermarking can include the use of visible watermarks. A visible watermark is typically provided as text, a pattern, a symbol or an image which may be perceived by a human observer as being overlaid original content. Visible watermarks may be provided having a see-through characteristic. See-through watermarks allow both the watermark and the original content to be viewed by a human observer.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with the concepts, systems, and techniques described herein, a system for applying a watermark over data or more generally content to be displayed on an electronic display or on any other means for visual presentation of content includes means for identifying content to be displayed, means for generating a masked watermark, means for generating a complement watermark, and means for rendering the masked watermark and complement watermark on the content to be displayed.

With this particular arrangement, a system for rendering a watermark on content in a manner which does not obfuscate the content when the content is displayed is provided. In embodiments, the content may be digitally represented (referred to herein as digital content). By identifying one or more data elements in the content to be displayed, regions of the content on which masked and complement watermarks may be rendered without overlaying the one or more data elements in the content to be displayed can be identified. The masked and complement watermarks can then be rendered in the identified regions of the digital content.

The concepts and techniques for rendering a watermark over digital content to be displayed may be utilized in desktop and application virtualization platforms, as a means for providing data security for the content to be displayed.

In an embodiment, the described concepts, systems and techniques allow a portion of a complete watermark to be overlaid if a portion of a data element is detected to be at the same location as any portion of the watermark when the watermark is rendered on the content. With this approach, an end-user is able to see the data element in the content being displayed without the data elements being overlapped or otherwise obfuscated by a watermark or portions of the watermark. This makes it unnecessary for the end-user to distinguish data element/information from the watermark and the user's attention on the data will not be disturbed. Furthermore, to avoid having information of the watermark (e.g. a purpose of the watermark or a message being conveyed by the watermark or the meaning of the watermark) lost due to masking of a portion or portions of a watermark, a threshold may be defined to ensure at least some number of cumulative watermarks are rendered on the digital content and shown when the digital content is displayed. By using some number of cumulative watermarks, information conveyed by the watermark will not be affected or otherwise compromised. For example, if the purpose of the watermark is to provide a security function, the security function of the watermark will not be affected or otherwise compromised.

In one aspect, the concepts described herein are directed toward an approach to render a watermark having parts of the watermark masked, so that the watermark will not overlay data elements in digital content on which the watermark is being rendered. Rather, the watermark is rendered on portions of the digital content which either do not include any data elements (e.g., the watermark or a portion thereof is rendered on blank areas of the content), or in regions of the content which least interfere (e.g. overlay or otherwise obfuscated) with underlying data elements when the content is displayed on a display device, an interface (e.g. a user interface), a webpage, a document, an image or any other means capable of visual presentation of content.

In accordance with the described concepts, systems and techniques, a threshold of the number of watermark rendering is selected. The threshold keeps at least the defined number of cumulative watermarks to be shown. If due to above reason of masked watermark pieces and the threshold is not reached, this solution will detect some blank areas to render overlaid watermark pieces, so to as meet the threshold.

In general overview, described is a system and technique which splits (or more generally divides) a complete watermark into two or more pieces (i.e., the two or more pieces when taken together form a complete watermark). When rendering the watermark on content (e.g. digital content), the system and technique detect whether any data elements exist at the location in the content where the watermark pieces are about to render. In response to determining that one or more watermark pieces are being rendered at a location in the content at which one or more data elements exist (i.e., one or more of the watermark pieces will overlap or otherwise interfere with one or more data elements), the one or more watermark pieces are masked (i.e., they are not rendered on the digital content) such that no overlap or interference occurs between the one or more watermark pieces and the one or more data elements when displayed (e.g. displayed on a screen interface or document). This allows the watermarks (e.g., complete watermarks, masked watermarks, and/or complement watermarks) as well as the data elements in the digital content displayed on the display to be readily viewed and easily understood by a viewing user.

It should be noted that it is not necessary to recognize or otherwise determine the information being conveyed and/or objects being shown by the data elements. Rather, the system and techniques need only detect the existence of data elements which results in processing which is simpler (and thus requires fewer processing resources and less time) than processing required to recognize information being conveyed. Thus, advantageously, in one embodiment detection of data elements may be determined by calculating a color distribution in a region of content on which a watermark is to be rendered. Furthermore, even if a portion of a watermark at a location in the content at which a data element is not present is masked, the portion of the watermark which is not masked can be complemented to ensure that a desired number of complete watermarks are displayed when the content is displayed., In this way, the security functionality provided by watermarking the digital content is still provided. Thus, advantageously, rapid processing techniques may be used to perform the detection of data elements in the digital content.

When a watermark is masked, the system may determine if the remaining watermark pieces (also referred to as complementary pieces of the watermark(s)) convey a sufficient amount of information to serve the intended function of the complete watermark (e.g., whether the rendered watermark pieces convey a sufficient amount of information to provide a security functionality). Such a determination may be made, for example, by utilizing a threshold number of complete watermarks. In embodiments, the threshold number may be defined by a system administrator. In embodiments, the threshold number may be determined by determining an amount of space in the digital content at which no data elements exist. Other techniques may also be used. If the rendered watermark pieces can cumulate to some number of watermark instances, greater than a specified watermark threshold (or in some embodiments, greater than or equal to the watermark threshold), then the rendering of the watermark pieces is deemed sufficient or otherwise acceptable. On the other hand, if the rendered watermark pieces do not cumulate to some number of watermark instances, greater than the watermark threshold (or in some embodiments, greater than or equal to the watermark threshold), then placement of watermark pieces is deemed not sufficient and the system may implement a complementation process. In embodiments, the complementation process renders the masked watermark piece(s) in a blank area(s) of the digital content as a complement watermark(s), such that the cumulative watermarks (i.e., the rendered watermark pieces, including the complement watermark(s)), satisfy the specified threshold,

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
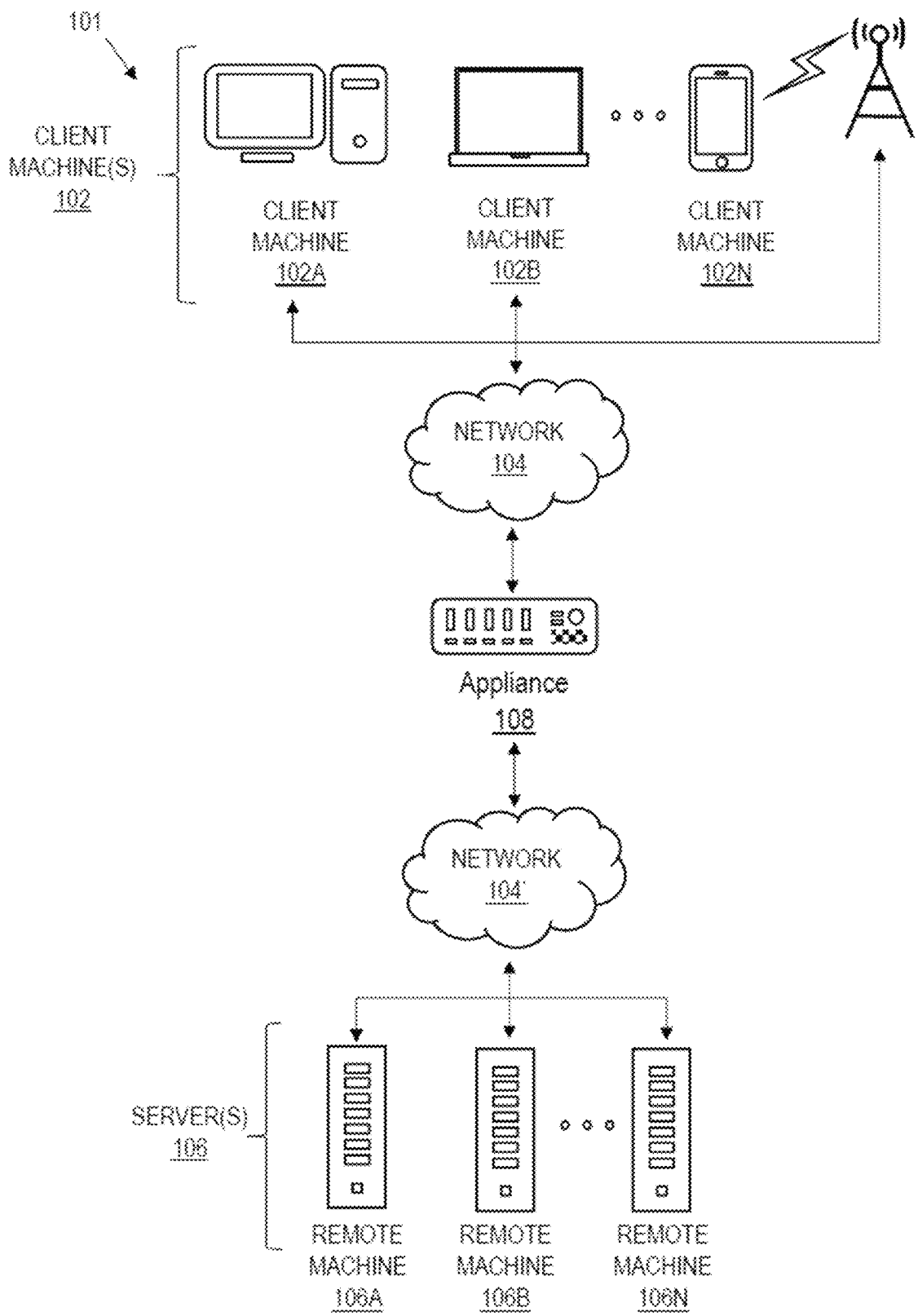
FIG. 1 is a block diagram illustrating an example network environment of computing devices in which various aspects of the disclosure may be implemented, in accordance with an embodiment of the present disclosure.

Ideally, visible watermarks are relatively robust against transformation of the content (for example, against image transformation where the content is a photograph, or against webpage transformation where the content is included in a webpage). Thus, a watermark may be used to protect or identify the content, for example, from tampering, to provide copyright protections, to provide notice or information and/or to provide digital rights management controls over the content, for instance. While visible watermarks can be applied to secure the content, such visible watermarks may obfuscate all or portions of the content (e.g., visible watermarks may obfuscate all or portions of objects and/or scenes in a photograph), thus making it difficult for an observer (e.g. a human observer or an image processing system or a recognition system (e.g. an optical character recognition system)) to visually perceive the content or to visually separate the watermark from portions of the content (e.g., portions of a photograph) obfuscated by the watermark.

Visible watermarks may also distract the viewer from the content (e.g., distract the viewer from the main subject of a photograph or a webpage, for instance), thereby degrading and/or interfering with the end-user experience. Thus, and in accordance with an embodiment of the present disclosure, improved watermarking techniques enable a user to apply a visual watermark to content in a manner as to not obfuscate or otherwise cause visual defects to data elements in the content when the content is displayed.

As used herein, the term "content" refers to the entirety of information to be visually presented. The information may, for example, be visually presented using any or all of text or images, to name a few examples. The content may be visually presented on a display, an interface (e.g. a user interface), a webpage, a document, a picture or by any other means capable of visual presentation of content. The content may be digital or analog (e.g. continuous parameters). The content may include one or more data elements.

A "data element" refers to individual pieces or units of data in content (e.g. digital data in digital content). Data elements may be of interest when the content is viewed, such as text, images, graphical elements, control elements, objects, colors, and pixels of sufficient intensity, to name a few examples. Content, and thus data elements may exist in the form of digital data including, but not limited to, images, text, graphical elements, control elements, or other forms of digital expression which may appear on a display (e.g., a display screen of computer or a mobile device, or any form of display or interface on which the content may visually presented).

As used in the remainder of this document, the term "watermark" refers to visual indicia. Any form of indicia may comprise a watermark. The indicia may for example, be text or images or a symbol or a combination thereof. A watermark can be visually seen when added or otherwise applied to content. Thus, for the purposes of the description provided herein, a distinction is made between a watermark and content. Specifically, a watermark is an element or indicia which can be perceived by a viewer, such as a human viewer, as being overlaid or otherwise applied to all or portions of content.

To apply a visual watermark to content in a manner as to not obfuscate or otherwise cause visual defects to data elements in displayed content, when rendering content that includes a watermark, the watermark applied to the content is segmented into portions with each portion corresponding to a piece of the complete watermark. Then, prior to rendering a particular watermark piece, a check is made to determine whether there is a data element of content at a location in the content at which the particular watermark piece is to be rendered. If it is determined that a data element is present at that location, the particular watermark piece is rendered such that the data element overlays the particular watermark piece so that data element, and not the watermark piece, is visible. Otherwise, if it is determined that no data element is present at that location, the watermark piece is rendered at that location.

Because the data element overlays the particular piece of the watermark, the data element at the same location in the content as the particular piece of the watermark is not obfuscated when content is displayed. Also, in this case, a portion of the watermark (e.g., the portion of the watermark overlaid by the data element) becomes "masked" by the overlaying data element. The result is referred to herein as a "masked watermark." The remaining watermark pieces are similarly processed to render the watermark on the content. Numerous configurations and modifications will be apparent in light of this disclosure.

Turning now to the figures, FIG. 1 is a block diagram illustrating an example network environment 101 of computing devices in which various aspects of the disclosure may be implemented, in accordance with an embodiment of the present disclosure. As shown, environment 101 includes one or more client machines 102A-102N, one or more remote machines 106A-106N, one or more networks 104, 104', and one or more appliances 108 installed within environment 101. Client machines 102A-102N communicate with remote machines 106A-106N via networks 104, 104'.

In some embodiments, client machines 102A-102N communicate with remote machines 106A-106N via an intermediary appliance 108. The illustrated appliance 108 is positioned between networks 104, 104' and may also be referred to as a network interface or gateway. In some embodiments, appliance 108 may operate as an application delivery controller (ADC) to provide clients with access to business applications and other data deployed in a datacenter, a cloud computing environment, or delivered as Software as a Service (SaaS) across a range of client devices, and/or provide other functionality such as load balancing, etc. In some embodiments, multiple appliances 108 may be used, and appliance(s) 108 may be deployed as part of network 104 and/or 104'.

Client machines 102A-102N may be generally referred to as client machines 102, local machines 102, clients 102, client nodes 102, client computers 102, client devices 102, computing devices 102, endpoints 102, or endpoint nodes 102. Remote machines 106A-106N may be generally referred to as servers 106 or a server farm 106. In some embodiments, a client device 102 may have the capacity to function as both a client node seeking access to resources provided by server 106 and as a server 106 providing access to hosted resources for other client devices 102A-102N. Networks 104, 104' may be generally referred to as a network 104. Networks 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, server 106 may execute a remote presentation services program or other program that uses a thin-client or a remote-display protocol to capture display output generated by an application executing on server 106 and transmit the application display output to client device 102.

In yet other embodiments, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some embodiments, network 104 may be: a local-area network (LAN); a metropolitan area network (MAN); a wide area network (WAN); a primary public network; and a primary private network. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
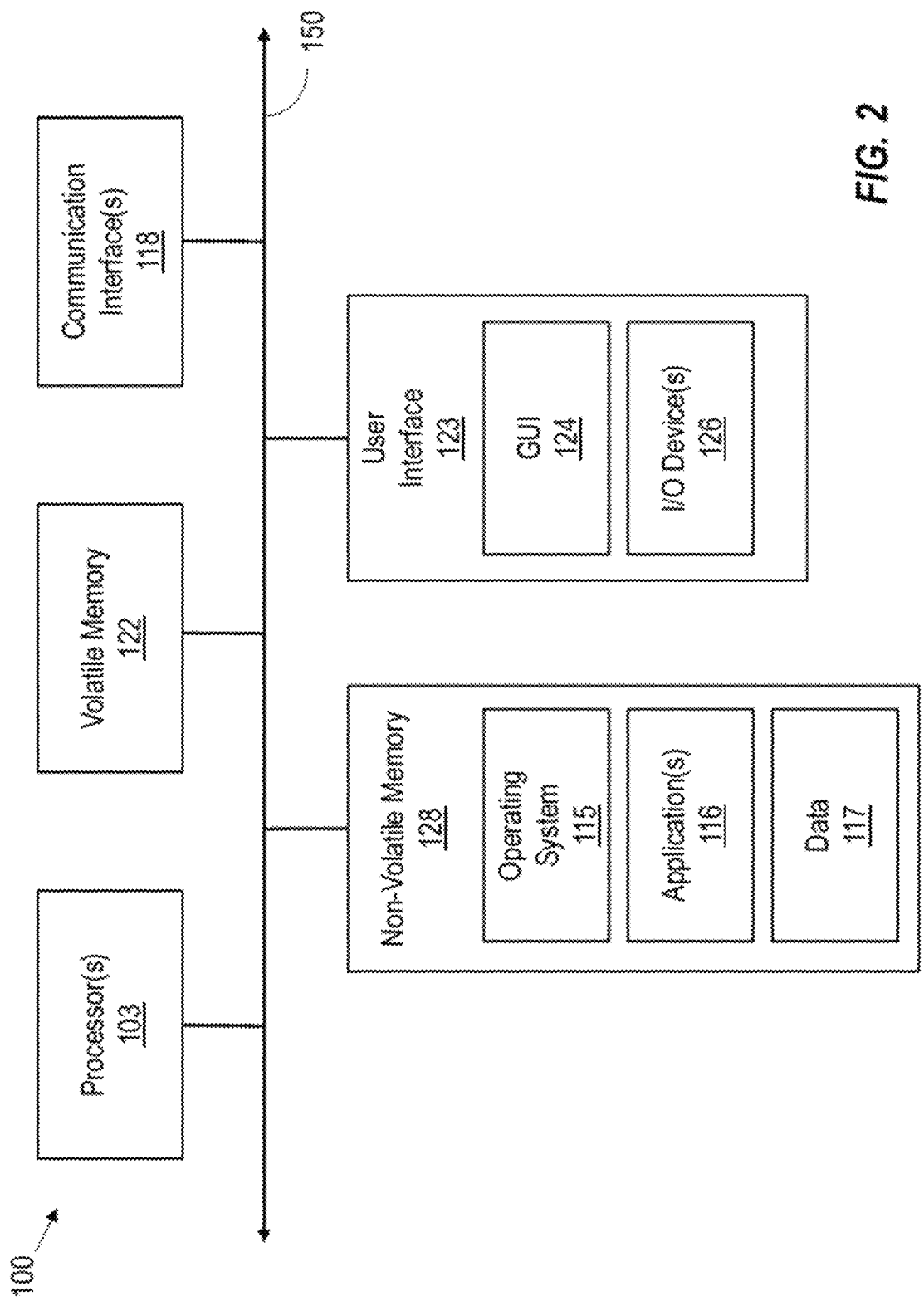
FIG. 2 is a block diagram illustrating selective components of an example computing device in which various aspects of the disclosure may be implemented, in accordance with an embodiment of the present disclosure.

FIG. 2 is a block diagram illustrating selective components of an example computing device 100 in which various aspects of the disclosure may be implemented, in accordance with an embodiment of the present disclosure. For instance, client devices 102, appliances 108, and/or servers 106 of FIG. 1 can be substantially similar to computing device 100. As shown, computing device 100 includes one or more processors 103, a volatile memory 122 (e.g., random access memory (RAM)), a non-volatile memory 128, a user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 stores an operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computing device 100 may communicate via communications bus 150.

The illustrated computing device 100 is shown merely as an example client device or server and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed-signal. In some embodiments, processor 103 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described embodiments, computing device 100 may execute an application on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
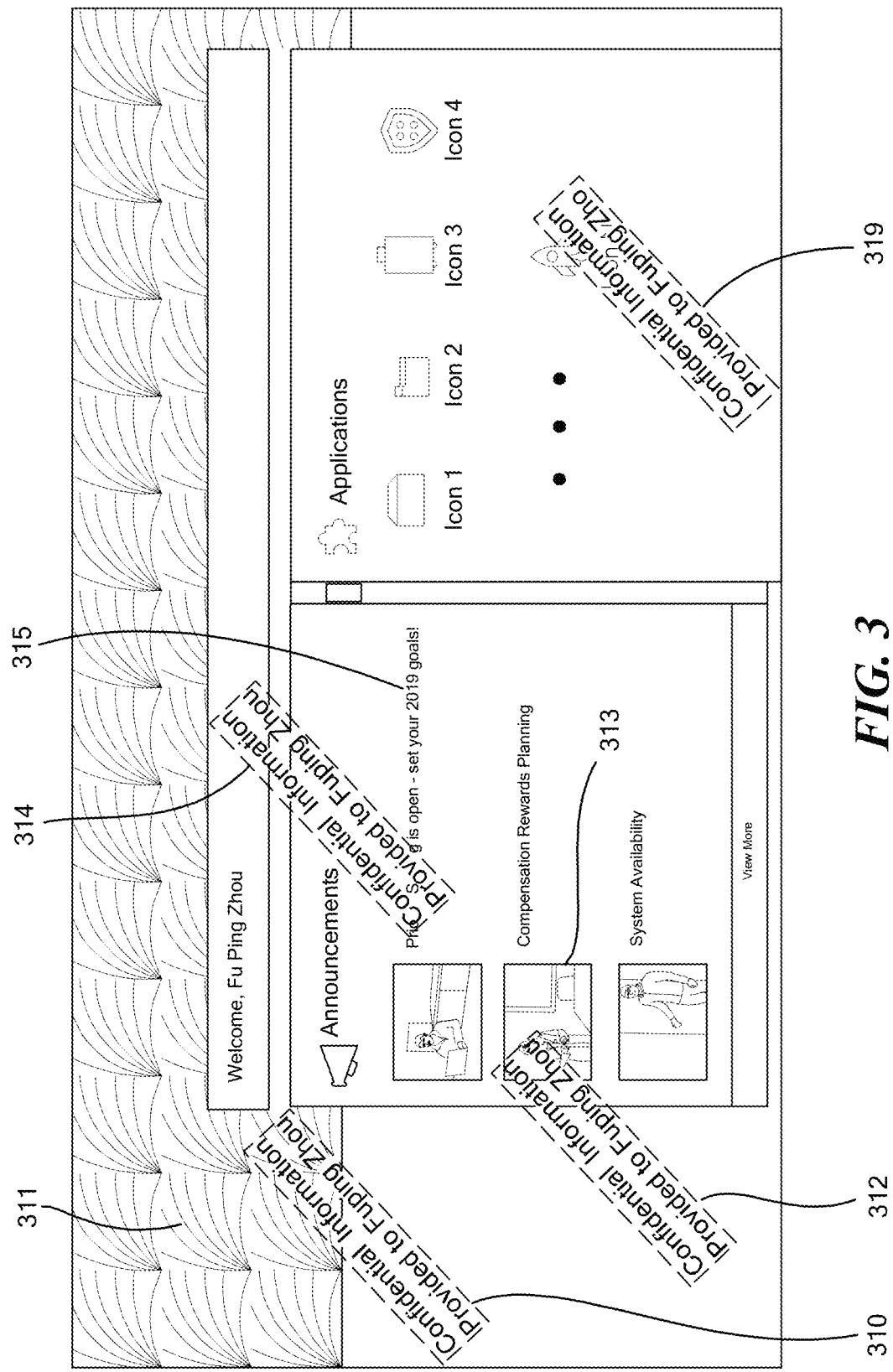
FIG. 3 is a diagram illustrating displayed data having a watermark disposed thereover resulting in one or more visual defects.

FIG. 3 is a diagram illustrating a displayed web page with content having a watermark disposed thereover resulting in one or more visual defects. As shown in FIG. 3, three watermarks 310, 312, and 314 are applied or otherwise added to contents of the webpage. As can be seen, each watermark 310, 312, and 314 is composed of two lines of text: the text "Confidential information" in a first line and the text "Provided to Fuping Zhou" in a second line below the first line. As can be further seen in FIG. 3, watermark 310 is rendered on the content in such a manner as to cause a portion of watermark 310 (e.g., the text "information" and "ing Zhou") to overlay a data element 311. Similarly, watermark 312 is rendered on the content in such a manner as to cause a portion of watermark 312 (e.g., the text "ion" and "hou") to overlay a data element 313, and watermark 314 is rendered on the content in such a manner as to cause a portion of watermark 314 (e.g., the text "Co" and "Prov") to overlay a data element 315. As can be seen in this example, portions of watermarks 310, 312, and 314 that overlay data elements in the content interfere with and cause visual defects to the data elements when watermarks 310, 312, and 314 are rendered on the content. Thus, it can be appreciated that trivially applying watermarks to content (e.g. a photograph or a webpage, to provide two examples) often leads to the watermarks obfuscating or otherwise interfering with data elements in the content when the watermarks are rendered on the content.

However, as will be described below in conjunction with FIGS. 4-8, in accordance with the concepts, systems and techniques described herein, a watermark may be rendered on content such that portions of the watermark that obfuscate or otherwise interfere with data elements in the content are masked to allow the data elements (which would otherwise be below the watermark) to be clearly visible when the content is displayed.

Figure 4:
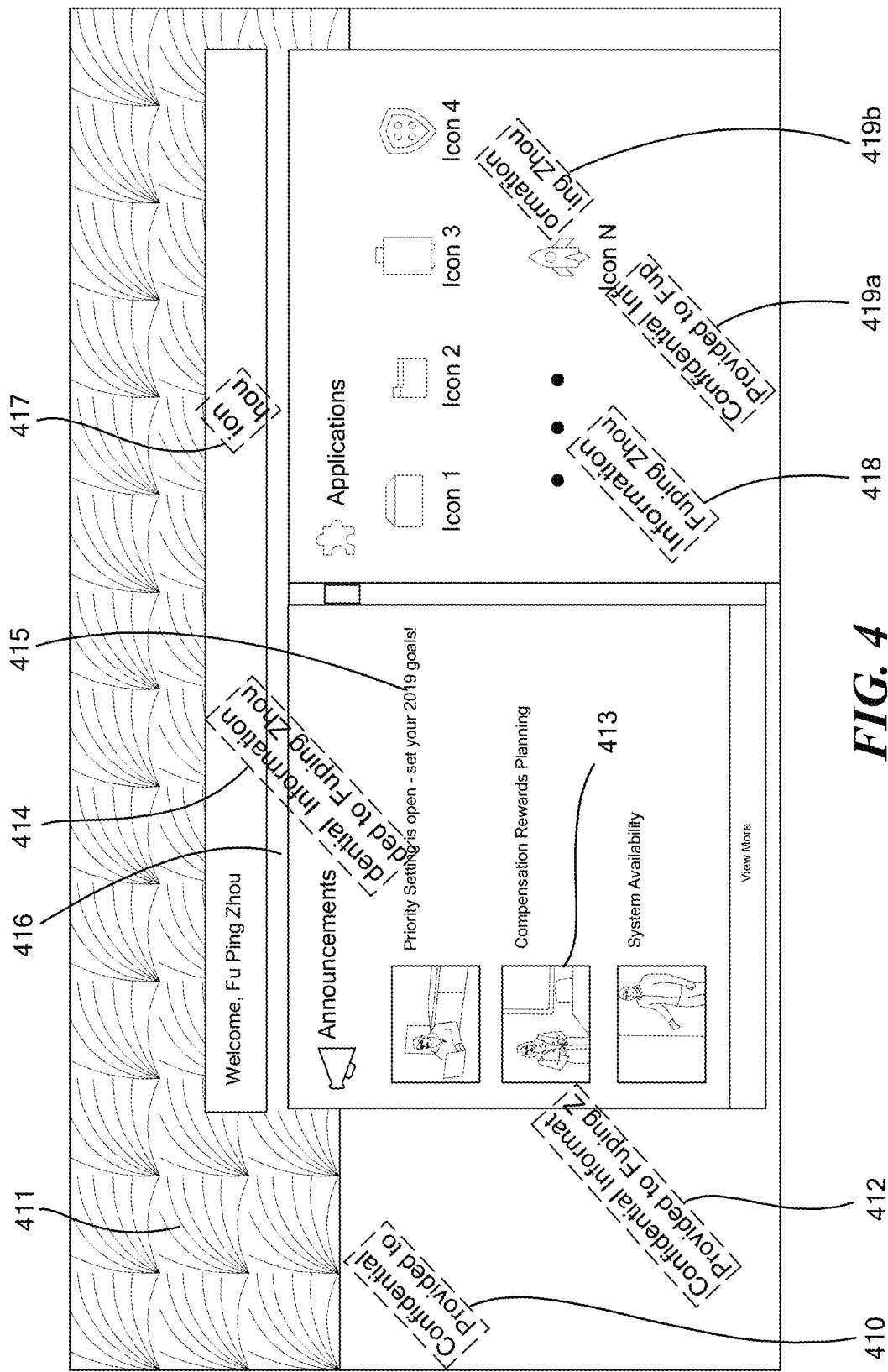
FIG. 4 is a diagram illustrating displayed data having masked and complement watermarks disposed thereover resulting in no visual defects, in accordance with an embodiment of the present disclosure.

FIG. 4 is a diagram illustrating a displayed web page having content with masked and complement watermarks disposed thereover resulting in no visual defects.

A masked watermark refers to a watermark in which a portion (or piece) thereof is not visible (e.g. has been removed) when the watermark is applied (e.g. rendered or otherwise applied) on content.

A complement watermark is a portion of a watermark which, when viewed with (or taken together with) a masked watermark, results in a complete (or at least a more complete) watermark. For reasons which will become apparent from the description hereinbelow, in embodiments, one or more complement watermarks may be needed to (along with a masked watermark) to result in a complete watermark. Also, in embodiments, a complement watermark may be used with more than one masked watermark to result in multiple complete watermarks.

Specifically, FIG. 4 illustrates portions of watermarks 310, 312, and 314 of FIG. 3 masked so as to not cause visual defects to data elements in the content. For instance, in the illustrative example of FIG. 4, the webpage may have been created to include three instances of the watermark on the left half of the webpage (e.g. as illustrated by watermarks 310, 312, and 314 in FIG. 3).

As shown in FIG. 4, three masked watermarks 410, 412, and 414 are rendered on a content of the webpage. Masked watermark 410 is a portion of watermark 310 in FIG. 3, masked watermark 412 is a portion of watermark 312 in FIG. 3, and masked watermark 414 is a portion of watermark 314 in FIG. 3. In particular, masked watermark 410 does not include the portion of the watermark (e.g., the text "Information" and "Fuping Zhou") that would overlay and obfuscate data element 411 in the webpage. Similarly, masked watermark 412 does not include the portion of the watermark (e.g., the text "tion" and "hou") that would overlay and obfuscate data element 413 in the webpage, and masked watermark 414 does not include the portion of the watermark (e.g., the text "Conf" and "Prov") that would overlay and obfuscate data element 415 in the webpage. That is, masked watermarks 410, 412, and 414 each include the portion of the watermark that does not overlay data elements (e.g., texts and images) of the content.

It should, however, be noted that some or all of a masked watermark can be rendered on a portion of the content that is not blank or otherwise an empty area in the content. For example, as can be seen in the example in FIG. 4, masked watermark 410 and a portion of masked watermark 412 are each rendered on respective portions of the content that are not blank but, rather, appear to have some type of coloring or grey shading. Also, a portion of masked watermark 414 (e.g., parts of the text "form" and "g Zho") is rendered to overlay a portion of a data element 416. According to some embodiments, this may be due to the criteria or threshold used to determine what constitutes a data element in the content (e.g., a data element in an image or a data element in a webpage), which will be further described below.

As further shown in FIG. 4, so-called "complement watermarks" 417 and 418 are rendered on the webpage. Complement watermarks 417 and 418 are rendered on the content so as to not overlay and obfuscate any data elements included in the content. For example, as can be seen in FIG. 4, complement watermarks 417 and 418 are rendered on areas of the content where there are no data elements (so-called "blank areas").

In brief, one or more complement watermarks can be applied to the content such that when the one or more complement watermarks are considered together (e.g. combined) with a masked watermark, a "complete" watermark may be viewed or otherwise perceived. According to an embodiment, a complement watermark can include a portion of a watermark that was "masked" (i.e., is not visible) when rendering the watermark on the content (e.g., the portion of the watermark that would have overlaid data elements in the content when rendered). In this sense, a complement watermark "complements" a masked watermark. That is, a masked watermark when taken together with one or more complement watermarks forms a complete watermark.

As can be seen in FIG. 4, complement watermark 417, which includes the text "tion" and "hou", complements masked watermark 412 (i.e., masked watermark 412 and complement watermark 417 can be combined to create a complete watermark—e.g., an instance of a complete watermark rendered on the content). Likewise, complement watermark 418, which includes the text "Information" and "Fuping Zhou", complements masked watermark 410 in that masked watermark 410 and complement watermark 418 can be combined to create a complete watermark (e.g., another instance of the complete watermark rendered on the content).

Thus, multiple complement watermarks may be combined with a masked watermark to create a complete watermark. That is, a portion of a watermark that was "masked", thus resulting in a masked watermark, can be segmented or otherwise split, and the segments may be included in multiple respective complement watermarks. It should also be noted that a complement watermark can complement one or more (multiple) masked watermarks.

Continuing the illustrative example of FIG. 4, it may have been that a threshold number of instances of a complete watermark (e.g., a pre-established watermark threshold), such as two (2), three (3), four (4), or other suitable number (N), is required or otherwise needed to be rendered on the content. In such examples, the specified threshold number of instances of the complete watermark may be rendered so as to preserve the intended security functionality associated with providing watermarks, for instance. In the example of FIG. 4, the watermark threshold may have been two (2). In this example case, the two instances of the complete watermark rendered by combining masked watermark 410 and complement watermark 418 and by combining masked watermark 412 and complement watermark 417 satisfy the specified watermark threshold. Note that masked watermark 414 need not be completed to create an instance of a complete watermark (e.g., need not be complemented with one or more complement watermarks) since the specified watermark threshold is satisfied by the combination of masked watermark 410 and complement watermark 418 and the combination of masked watermark 412 and complement watermark 417.

However, and as can be further seen in FIG. 4, masked watermark 414 can be rendered on the content in its incomplete or masked state. Furthermore, as will be appreciated in light of this disclosure, any two of the masked watermarks 410, 412, and 414, and not necessarily masked watermarks 410 and 412, may be complemented to create two instances of the complete watermark rendered on the content, thus satisfying the specified watermark threshold. In some such example embodiments, all three masked watermarks 410, 412, and 414 may be complemented to satisfy the specified watermark threshold. In a more general sense, any number of the watermarks added to content can be complemented to satisfy the specified watermark threshold.

Figure 4A:
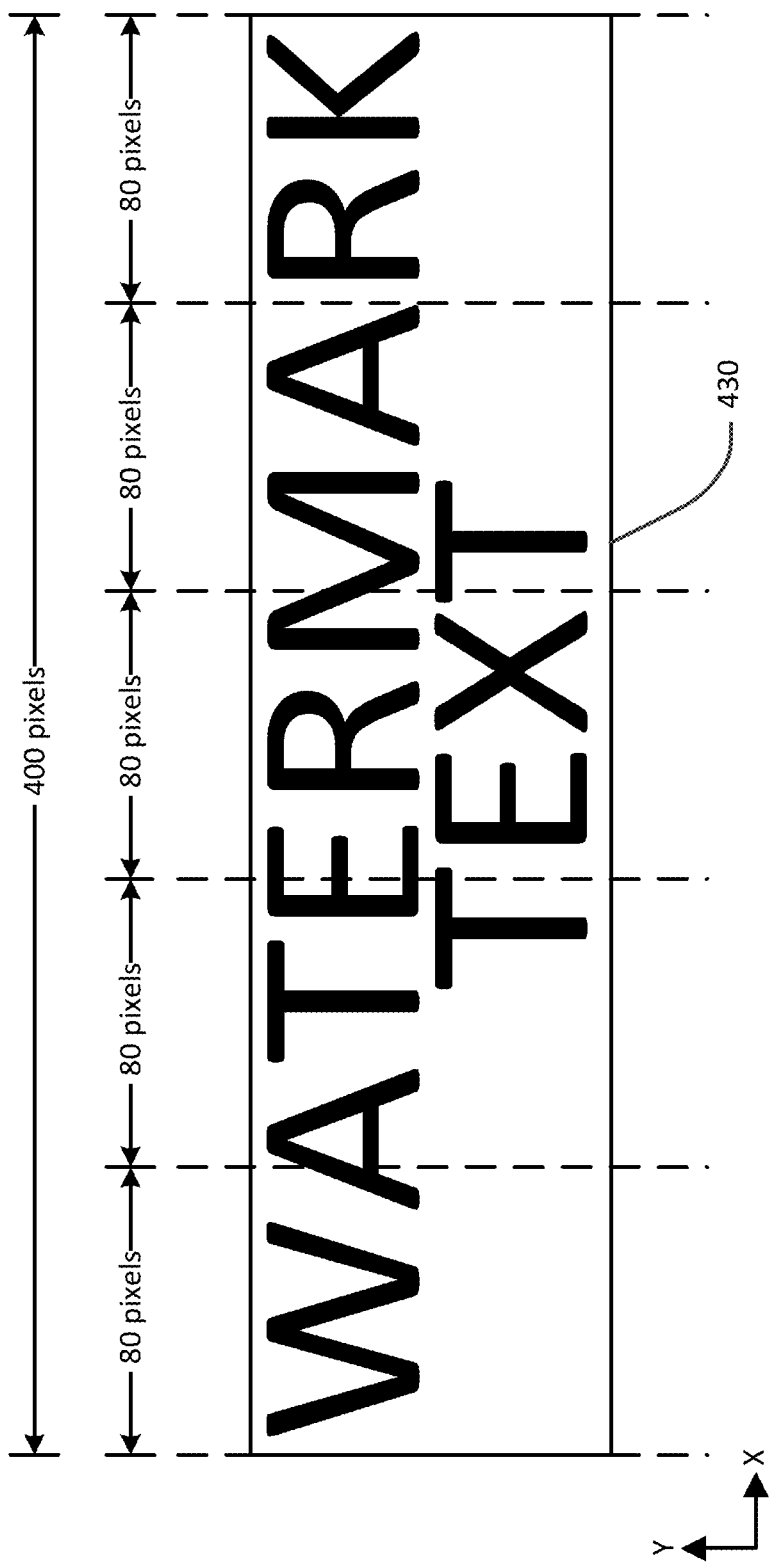
FIG. 4A shows an illustrative watermark segmented (or split) into multiple pieces.

FIG. 4A shows an illustrative watermark segmented (or split) into multiple pieces. As shown, the illustrative watermark is composed of two lines of text: the text "WATERMARK" in a first line and the text "TEXT" in a second line below the first line. In particular, and in accordance with certain of the embodiments disclosed herein, a watermark is segmented into multiple pieces, and the pieces of the watermark are processed to determine whether a portion or portions of the watermark would overlay data elements in the content when the watermark is rendered on the content. In some such embodiments, a bounding box is generated for the watermark such that the bounding box encloses the watermark. The generated bounding box delineates or defines the bounds (e.g., boundary) of the watermark. For example, a bounding box may be specified by the coordinates of the four corners of the bounding box. In some embodiments, a bounding box for a watermark is generated in a manner as to tightly bound the watermark. That is, the bounding box is generated such that, within the bounding box, the number of pixels that do not represent the watermark is reduced or, ideally, minimized. Reducing the number of pixels that do not represent the watermark in the bounding box results in a reduction in computational costs. For example, reducing (or ideally minimizing) the number of pixels that do not represent a watermark reduces the number of "unnecessary" pixels that need to be processed in segmenting the watermark.

As shown in the illustrative embodiment of FIG. 4A, a bounding box 430 can be generated for the watermark. In one embodiment, a pixel map that represents the area inside bounding box 430, including the watermark, can be created and used to appropriately segment the watermark into pieces. For example, in one such embodiment, bounding box 430 can be segmented along its width (e.g., x-dimension) to segment the watermark enclosed within bounding box 430. As can be seen in the example of FIG. 4A, bounding box 430 is segmented into five (5) pieces so as to create five pieces of the watermark. In other embodiments, a bounding box enclosing a watermark can be segmented along its height (e.g., y-dimension) to segment the watermark enclosed within the bounding box. In any case, the pixel map of a bounding box can be used to segment the bounding box.

In embodiments, the watermark can be split into equal size pieces. For example, suppose the watermark illustrated in FIG. 4A is 400 pixels in width. In this example case, the watermark 400 pixels wide may be segmented into five pieces (five watermark pieces), wherein each piece is 80 pixels in width, as can be seen in FIG. 4A.

In embodiments, the number of pieces into which a watermark is to be segmented may be pre-established (i.e. fixed) or may be tunable (i.e. selectable). In one example implementation, the number of pieces into which a watermark is to be segmented may be specified using a tunable parameter. For example, this tunable parameter may be specified in a configuration file that is accessible to an authorized user (such as a system administrator), and the user may tune or adjust the parameter based on a desired level of performance. In some implementations, this tunable parameter may be automatically tuned (e.g., via a processor) based on current and/or past levels of performance. In any case, the number of pieces into which a watermark is to be segmented can be determined based on one or more factors such as the size of the watermark (e.g., the number of pixels in the watermark or, in the case of a text watermark, the number of letters in the watermark; the amount of space (e.g., area) available in which a watermark may be placed, the density of data elements in the content, and a ratio of the number of pixels in the watermark to the number of pixels in the data elements to be displayed, to provide a few examples.

In embodiments, the watermark can be segmented into pieces which are not equal in size. For example, if the watermark is 400 pixels in width, then the watermark may be split into six pieces of 50 pixels width each and one piece of 100 pixels width. In one example implementation, the watermark may be presented in a window with a horizontal scroll bar and/or a vertical scroll bar. A user can then manipulate the provided scroll bars to indicate where and how the watermark is to be split or segmented (thus, effectively selecting the number of segments).

Figure 5:
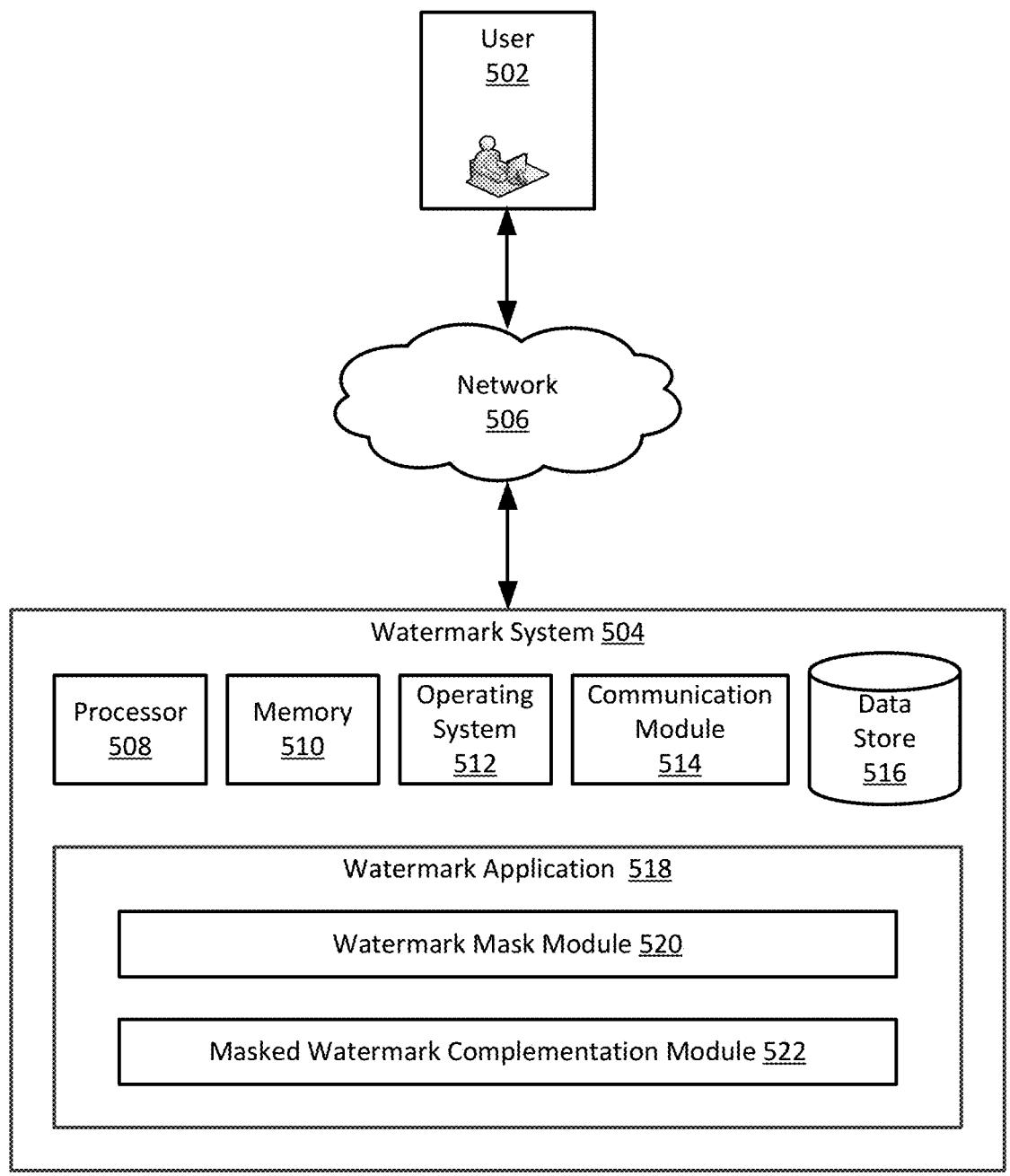
FIG. 5 is a block diagram schematically illustrating selected components of an example networked computer system that can be used to create masked watermarks on content, in accordance with an embodiment of the present disclosure.

FIG. 5 is a block diagram schematically illustrating selected components of an example networked computer system that can be used to create masked watermarks on content, in accordance with an embodiment of the present disclosure. More specifically, the system illustrated in FIG. 5 can be understood as enabling a user 502 to leverage the services of a watermark system 504. For instance, user 502 can use the services of watermark system 504 to render one or more masked watermarks on content. In some implementations of watermark system 504, content that includes watermarks may have been created, and user 502 can use the services of watermark system 504 to render one or more of the watermarks on the content as masked watermarks. In such embodiments, user 502 can communicate with watermark system 504 via a network 506. Note that the illustrative networked computer system depicted in FIG. 5 is an example only and assumes only a single user. However, it should be understood that the networked computer system depicted in FIG. 5 is easily extended to an arbitrary number of users and their associated devices for use in rendering masked watermarks and/or generating content to include masked watermarks in accordance with the techniques described herein. For example, a multiple number of users can leverage the services of watermark system 504. It will therefore be appreciated that the embodiments disclosed herein are not intended to be limited to the use of watermark system 504 by a single user at any one time. It will also be appreciated that the embodiments disclosed herein are not intended to be limited to the use of watermark system 504 to render masked watermarks on content. Rather, it will be apparent in light of this disclosure that watermark system 504 can be used to add masked watermarks to content, such as content in a photograph, content in a webpage, or content in a digital book, to provide three examples.

Network 506 may be a local area network (such as a home-based or office network), a wide area network (such as the Internet), a peer-to-peer network (such as a Bluetooth connection), or a combination of such networks, whether public, private, or both. In certain embodiments, at least a portion of the functionality associated with network 506 is provided by a cellular data network, thereby making it easier for users of mobile computing devices to leverage the services of watermark system 504. In general, communications amongst the various entities and resources described herein may occur via wired or wireless connections, such as may be provided by Wi-Fi or mobile data networks. In this regard, network 506 is substantially similar to networks 104 and 104' described previously with respect to FIG. 1.

As illustrated in FIG. 5, user 502 has access to a device that facilitates interaction with components of watermark system 504 illustrated in FIG. 5 or are otherwise described herein. For example, in certain embodiments, user 502 has access to one or more of a variety of suitable computing devices, including devices such as desktop computers, laptop computers, workstations, enterprise class server computers, handheld computers, tablet computers, cellular telephones, smartphones, and set-top boxes. Other devices may be used in other embodiments. The device or devices used by user 502 optionally include a wired and/or wireless communication adapter that enables communication via network 506. The device or devices also optionally include input/output components such as one or more of a tactile keyboard, a display, a touch sensitive display, a microphone, a camera, and location services. Such input/output components allow user 502 to not only control operation of its own device, but also to control certain operational aspects of watermark system 504.

Referring still to the example embodiment illustrated in FIG. 5, watermark system 504 can be configured to facilitate the generation of content that includes one or more masked watermarks. In some embodiments, watermark system 504 is also configured to facilitate the masking of pre-existing watermarks included in the content in order to cause rendering of the content with masked watermarks. To this end, in one embodiment, watermark system 504 includes one or more software modules configured to implement certain of the functionalities disclosed herein, and optionally further includes hardware configured to enable such implementation. This hardware and/or software may include, but is not limited to, a processor 508, a memory 510, an operating system 512, a communication module 514, and a data store 516.

Processor 508 may be designed to control the operations of the various other components of watermark system 504. Processor 508 may include any processing unit suitable for use in watermark system 504, such as a single core or multi-core processor. In general, processor 508 may include any suitable special-purpose or general-purpose computer, computing entity, or computing or processing device including various computer hardware, or firmware, and may be configured to execute instructions, such as program instructions, stored on any applicable computer-readable storage media. For example, processor 508 may include a microprocessor, a central processing unit (CPU), a microcontroller, a digital signal processor (DSP), an application-specific integrated circuit (ASIC), a Field-Programmable Gate Array (FPGA), Complex Instruction Set Computer (CISC), Reduced Instruction Set Computer (RISC), multi core, or any other digital or analog circuitry configured to interpret and/or to execute program instructions and/or to process data, whether loaded from memory or implemented directly in hardware. Although illustrated as a single processor in FIG. 5, processor 508 may include any number of processors and/or processor cores configured to, individually or collectively, perform or direct performance of any number of operations described in the present disclosure. In this regard, processor 508 is substantially similar to processor 103 described previously with respect to computing device 100 of FIG. 2.

Memory 510 may include computer-readable storage media configured for carrying or having computer-executable instructions or data structures stored thereon. Such computer-readable storage media may include any available media that may be accessed by a general-purpose or special-purpose computer, such as processor 508. By way of example, and not limitation, such computer-readable storage media may include non-transitory computer-readable storage media including Random Access Memory (RAM), Dynamic Random Access Memory (DRAM), Synchronized Dynamic Random Access Memory (SDRAM), Static Random Access Memory (SRAM), non-volatile memory (NVM), or any other suitable storage medium which may be used to carry or store particular program code in the form of computer-executable instructions or data structures and which may be accessed by a general-purpose or special-purpose computer. Combinations of the above may also be included within the scope of computer-readable storage media. In this regard, memory 510 is substantially similar to volatile memory 122 described previously with respect to computing device 100 of FIG. 2.

Operating system 512 may comprise any suitable operating system, such as UNIX®, LINUX®, MICROSOFT® WINDOWS® (Microsoft Crop., Redmond, Wash.), GOOGLE® ANDROID™ (Google Inc., Mountain View, Calif.), APPLE® iOS (Apple Inc., Cupertino, Calif.), or APPLE® OS X° (Apple Inc., Cupertino, Calif.). As will be appreciated in light of this disclosure, the techniques provided herein can be implemented without regard to the particular operating system provided in conjunction with watermark system 504, and therefore may also be implemented using any suitable existing or subsequently developed platform. In this regard, operating system 512 is substantially similar to operating system 115 described previously with respect to computing device 100 of FIG. 2.

Communication module 514 can be any appropriate network chip or chipset which allows for wired or wireless communication via a network or networks, such as network 506 for instance, to one or more of the other components described herein. Communication module 514 can also be configured to provide intra-device communications via a bus or an interconnect. In this regard, communication module 514 is substantially similar to communication interface 118 described previously with respect to computing device 100 of FIG. 2.

Data store 516 may include any type of computer-readable storage media configured for short-term or long-term storage of data. By way of example, and not limitation, such computer-readable storage media may include a hard drive, solid-state drive, Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), non-volatile memory (NVM), or any other storage medium, including those provided above in conjunction with memory 510, which may be used to carry or store particular program code in the form of computer-readable and computer-executable instructions, software or data structures for implementing the various embodiments as disclosed herein and which may be accessed by a general-purpose or special-purpose computer. Combinations of the above may also be included within the scope of computer-readable storage media. Data store 516 may be provided on watermark system 504 or provided separately or remotely from watermark system 504. In this regard, data store 516 is substantially similar to non-volatile memory 128 described previously with respect to computing device 100 of FIG. 2.

Referring again to the example embodiment illustrated in FIG. 5, watermark system 504 further includes a watermark application 518, which includes a watermark mask module 520 and a masked watermark complementation module 522. Watermark application 518 is generally configured to provide the overall control of the masking of watermarks and rendering of masked watermarks on content utilizing the services and functionality of watermark mask module 520 and masked watermark complementation module 522. The watermark application may also render the content and watermarks on an image, display, browser, user interface, a printed document or the like utilizing the services and functionality of watermark mask module 520 and masked watermark complementation module 522.

In particular, and according to some embodiments, watermark application 518 determines the presence of a watermark to be rendered on the content at or when the content is being rendered for display on a display device, for example. To render the watermark, watermark application 518 can segment the watermark into multiple pieces and cause the rendering of the watermark piece by piece. In some such embodiments, watermark application 518 can utilize watermark mask module 520 to render each watermark piece.

As will be further described below, according to one embodiment, watermark mask module 520 can either render a watermark piece on the content (e.g., so that the watermark piece overlays data in the content) or render the watermark such that a data element in the content overlays the watermark piece. In the case where a data element overlays the watermark piece, the watermark piece becomes masked thus resulting in the watermark being rendered on the content as a masked watermark.

In some embodiments, watermark application 518 is configured to check that the instances of the masked watermarks, including any complete watermarks (any watermarks that are not masked), rendered on content (and subsequently on an image, display, or browser, user interface, a printed document or the like) satisfy a watermark threshold. For example, when a watermark is rendered as a masked watermark on the content, the intended function of the watermark (a complete watermark) may not be preserved. That is, the masked watermark that is rendered may not convey a sufficient amount of information to serve the intended function for the complete watermark. The watermark threshold, which defines a number of complete watermark instances that need to be rendered on the content, may be a form of guarantee that the intended functionality of watermarking content is not lost by rendering masked watermarks on the content. In such embodiments, watermark application 518 checks to determine whether the rendered watermark pieces (the watermark pieces rendered as part of rendered masked watermarks and rendered complete watermarks) satisfy the watermark threshold. If the rendered watermark pieces can combine or otherwise cumulate to a number of complete watermark instances to satisfy the watermark threshold, then watermark application 518 can conclude that the rendering of the watermark pieces is acceptable or otherwise sufficient. Otherwise, if the rendered watermark pieces do not cumulate to a number of complete watermark instances to satisfy the watermark threshold, then watermark application 518 can conclude that the rendering of the watermark pieces is not sufficient. In cases where the rendered watermark pieces do not cumulate to a number of complete watermark instances to satisfy the watermark threshold, watermark application 518 can utilize masked watermark complementation module 522 to render the masked watermark pieces (e.g., the portions of the watermarks masked during the rendering of the watermarks). As will be further described below, according to one embodiment, masked watermark complementation module 522 can render the masked watermark pieces on the content as necessary to satisfy the watermark threshold.

In embodiments, the watermark threshold may be specified using a tunable parameter. For example, this tunable parameter may be specified in a configuration file that is accessible to an authorized user (such as a system administrator), and the user may tune or adjust the parameter based on a desired level of performance. In some implementations, this tunable parameter may be automatically tuned (e.g., via a processor) based on one or more factors such as an amount of space in the content at which no data elements exist, to provide only one example. Other factors may also be used such as one or more of the factors described previously with respect to determining the number of pieces to segment a watermark.

Watermark mask module 520 is configured to detect the presence of data elements at a location in the content at which a watermark piece is to be rendered. For example, in an example implementation, watermark mask module 520 can detect data elements in the content based on a distribution of the colors (e.g., color histogram) in the content. In other implementations, watermark mask modules 520 may employ other techniques, such as pixel intensity (gray intensity or color intensity), pixel luminance, and edge detection, to provide a few examples, to detect data elements in the content, as will be apparent to one of skill in the art. If a data element is detected at a location a watermark piece is to be rendered, then watermark mask module 520 renders the watermark piece on the content such that the data element overlays the watermark piece. Otherwise, if a data element is detected at a location a watermark piece is to be rendered, then watermark mask module 520 renders the watermark piece on the content (e.g., the watermark piece overlays the data in the content). Watermark mask module 520 is further described below with respect to FIG. 7.

Masked watermark complementation module 522 is configured to complement the rendered masked watermarks by rendering the portions of the masked watermarks which were not rendered due to the presence of data elements. To do so, in accordance with one embodiment, masked watermark complementation module 522 organizes the watermark pieces that need to be rendered into organized lists of watermark pieces. As an example, assume a watermark is composed of watermark pieces A, B, C, D, E and F. Also assume that a first rendered instance of the watermark on the content is a first masked watermark having watermark pieces A, B, and C, and a second rendered instance of the watermark on the content is a second masked watermark having watermark pieces E and F. That is, in rendering the two instances of the watermark, watermark pieces D, E, and F have been masked (overlaid with a data element) in the first masked watermark, and watermark pieces A, B, C, and D were masked in the second masked watermark. In this example, masked watermark complementation module 512 can organize watermark pieces D, E, and F into a first list and watermark pieces A, B, C, and D into a second list. Watermark pieces D, E, and F included in the first list effectively become one watermark piece, and watermark pieces A, B, C, and D included in the second list effectively become another watermark piece. Here, the first list of watermark pieces D, E, and F can be rendered together to complement the first masked watermark (e.g., the rendered first masked watermark when complemented by the rendered watermark pieces D, E, and F form a first instance of the complete watermark), and the second list of watermark pieces can be rendered together to complement the second masked watermark (e.g., the rendered second masked watermark when complemented by the rendered watermark pieces A, B, C, and D form a second instance of the complete watermark). Then, starting with the longest list of needed watermark pieces, masked watermark complementation module 522 determines whether there is an area in the content that does not contain a data element and is large enough to render the watermark pieces in the list. If such an area is found in the content, masked watermark complementation module 522 renders the watermark pieces in the list on the found area. The rendered watermark pieces can be referred to as a complement watermark. Otherwise, if such an area is not found in the content, masked watermark complementation module 522 splits the watermark pieces in the list into smaller pieces (e.g., splits what was effectively one watermark piece in the list into multiple smaller watermark pieces), and attempts to render the smaller watermark pieces to effectively render the watermark pieces in the list. Masked watermark complementation module 522 repeats this process for the next list of needed watermark pieces (e.g., the next largest list of needed watermark pieces), until the specified watermark threshold is satisfied or until the all the lists of needed watermark pieces have been processed. Masked watermark complementation module 522 is further described below with respect to FIG. 8.

In various embodiments, additional components or a subset of the illustrated components can be employed without deviating from the scope of the present disclosure. For instance, other embodiments may integrate the various functionalities of the watermark application, including the watermark mask module and the masked watermark complementation module into fewer modules (e.g., one or two) or more modules (e.g., four or five, or more). In addition, further note that the various components of the watermark application may be distributed across additional machines. In some cases, the watermark mask module and/or the masked watermark complementation module may be downloaded from a server computing system onto the user device for local execution. In some cases, the functionality provided by the watermark mask module and/or the masked watermark complementation module may be provided on a server computing system communicatively coupled to the user device. In a more general sense, the degree of integration and distribution of the functional component(s) provided herein can vary greatly from one embodiment to the next, as will be appreciated in light of this disclosure.

The embodiments described herein can be implemented in various forms of hardware, software, firmware, or special purpose processors. For example, in one embodiment, a non-transitory computer readable medium includes instructions encoded thereon that, when executed by one or more processors, cause aspects of watermark system 504 described herein to be implemented. The instructions can be encoded using any suitable programming language, such as C, C++, object-oriented C, Java, JavaScript, Visual Basic .NET, BASIC, Scala, or alternatively, using custom or proprietary instruction sets. Such instructions can be provided in the form of one or more computer software applications or applets that are tangibly embodied on a memory device, and that can be executed by a computer having any suitable architecture. In one embodiment, the system can be hosted on a given website and implemented, for example, using JavaScript or another suitable browser-based technology to render, for example, the masked watermarks and/or complement watermarks described herein.

The functionalities disclosed herein can optionally be incorporated into a variety of different software applications and systems, including watermarking applications, image sharing applications, photo sharing applications, web authoring applications, and web authoring systems, to name a few examples. The functionalities disclosed herein can additionally or alternatively leverage services provided by separate software applications and systems. For example, in one embodiment, the functionalities disclosed herein can be implemented in a cloud environment, such as Microsoft® Azure®, AWS®, Google Cloud™, or any suitable cloud environment. Additionally or alternatively, the functionalities disclosed herein can be implemented using an IaaS framework as described, for example, in conjunction with FIG. 5A. The computer software applications disclosed herein may include a number of different modules, sub-modules, or other components of distinct functionality, and can provide information to, or receive information from, still other components and services. These modules can be used, for example, to communicate with input/output devices such as a display screen, a touch sensitive surface, auditory interface, a digital camera, or any other suitable input/output device. Other components and functionality not reflected in the illustrations will be apparent in light of this disclosure, and it will be appreciated that the present disclosure is not intended to be limited to any particular hardware or software configuration. Thus, in other embodiments, the components illustrated in FIG. 5 may include additional, fewer, or alternative subcomponents. Furthermore, in some cases, one or more of the modules and components illustrated in FIG. 5 may be downloaded from a server computing system onto a user device for local execution.

In alternative embodiments, the computers and modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used in this regard, and that the present disclosure is not intended to be limited to any particular system architecture.

Figure 5A:
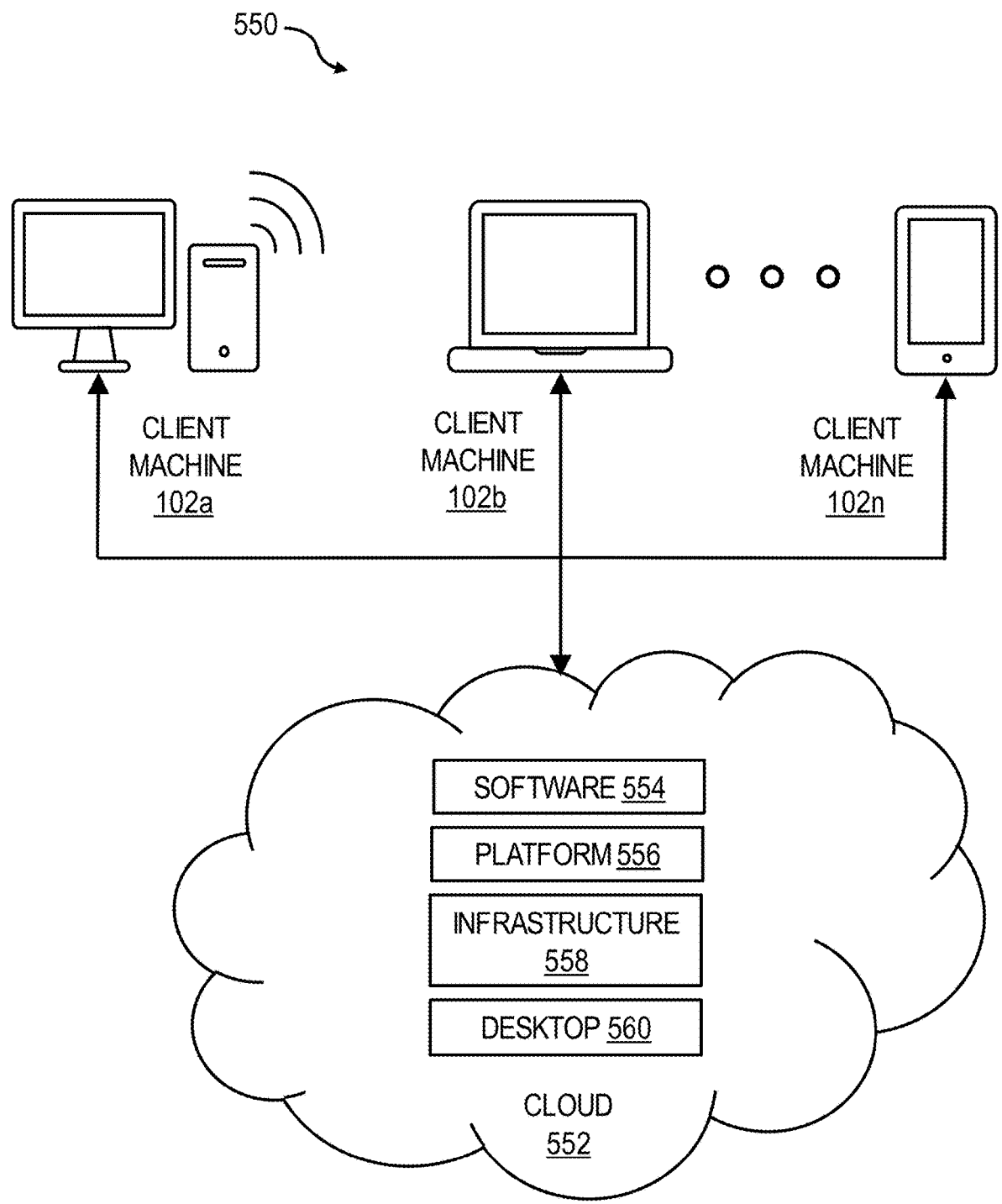
FIG. 5A is a schematic block diagram of a cloud computing environment in which various aspects of the disclosure may be implemented.

Referring now to FIG. 5A, a cloud computing environment 550 is depicted, which may also be referred to as a cloud environment, cloud computing or cloud network. The cloud computing environment 550 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 550, one or more clients 102a-102n (such as those described above) are in communication with a cloud network 552. The cloud network 552 may include back-end platforms, e.g., servers, storage, server farms or data centers. The users or clients 102a-102n can correspond to a single organization/tenant or multiple organizations/tenants. More particularly, in one example implementation the cloud computing environment 550 may provide a private cloud serving a single organization (e.g., enterprise cloud). In another example, the cloud computing environment 550 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 550 may provide a hybrid cloud that is a combination of a public cloud and a private cloud. Public clouds may include public servers that are maintained by third parties to the clients 102a-102n or the enterprise/tenant. The servers may be located off-site in remote geographical locations or otherwise.

The cloud computing environment 550 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 550 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 550 can provide an elasticity to dynamically scale out or scale in response to different demands from one or more clients 102. In some embodiments, the cloud computing environment 550 can include or provide monitoring services to monitor, control and/or generate reports corresponding to the provided shared services and resources.

In some embodiments, the cloud computing environment 550 may provide cloud-based delivery of different types of cloud computing services, such as Software as a service (SaaS) 554, Platform as a Service (PaaS) 556, Infrastructure as a Service (IaaS) 558, and Desktop as a Service (DaaS) 560, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 6:
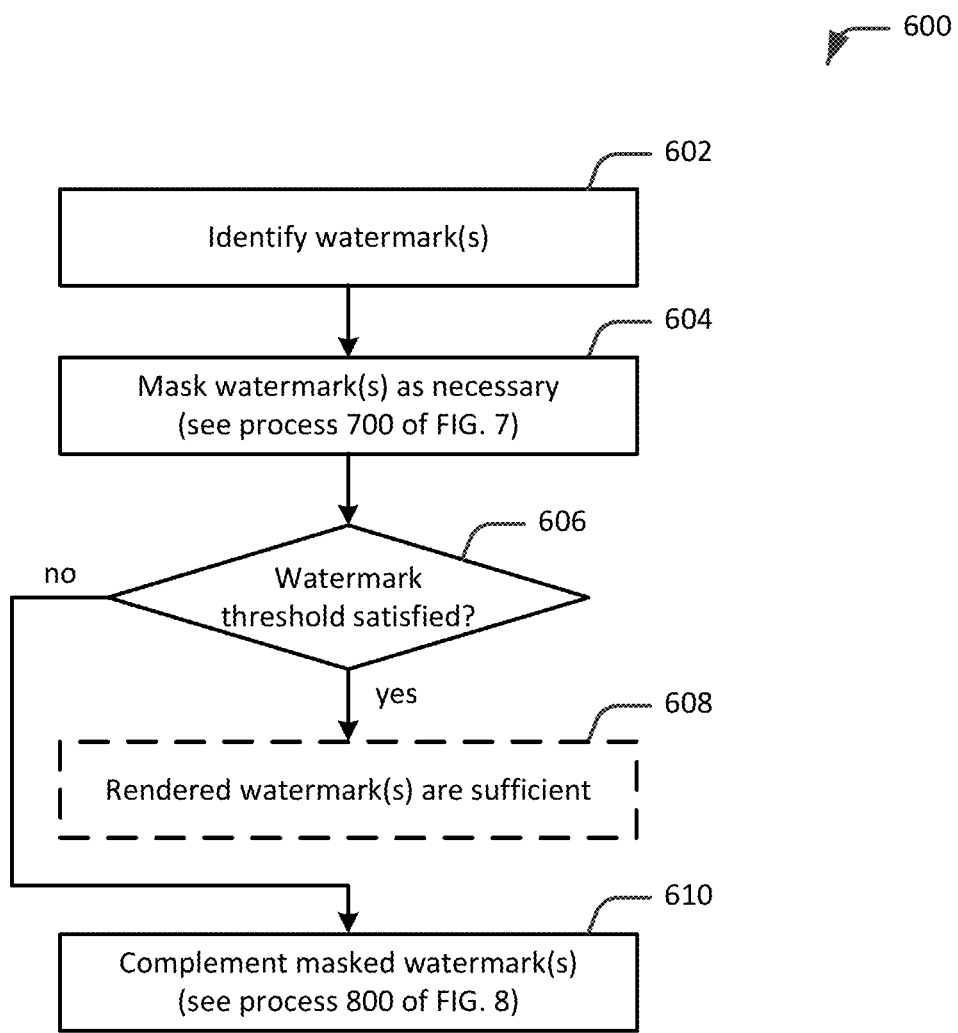
FIG. 6 is a flow diagram illustrating an example process for rendering masked watermarks, in accordance with an embodiment of the present disclosure.

FIG. 6 is a flow diagram illustrating an example process 600 for rendering masked visual watermarks, in accordance with an embodiment of the present disclosure. The operations, functions, or actions illustrated in example process 600, and example processes 700 and 800 further described below, may in some embodiments be performed by various components of watermark application 518 of FIG. 5. The operations, functions, or actions described in the respective blocks of example process 600, and example processes 700 and 800, may also be stored as computer-executable instructions in a computer-readable medium, such as memory 510 and/or data store 516 of watermark system 504 of FIG. 5.

As will be further appreciated in light of this disclosure, for this and other processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

With reference to FIG. 6, the operations of process 600 can be performed by a watermark application (such as watermark application 518) executing on a processor such as processor 508, for example. At operation 602, the watermarks that need to be rendered on content (e.g. an image) are identified. For example, data regarding the watermark such as the watermark itself, size of the watermark, and orientation of the watermark, to provide a few examples, number of instances of the watermark to render, and locations in the content at which to render the instances of the watermark may be provided in a watermark definition file. At operation 604, the identified watermarks are rendered on the content by masking the watermarks as necessary. In an example implementation, watermark mask module 520 may be utilized to render the watermarks on the content. At operation 606, a check is made to determine whether the instances of the rendered watermarks, including the rendered masked watermarks, satisfy a specified watermark threshold (i.e., are at least a threshold number of complete watermarks being generated and/or rendered). If the watermark threshold is satisfied, then, at operation 608, a conclusion is made that the instances of the rendered watermarks are sufficient. Otherwise, if the watermark threshold is not satisfied, then, at operation 610, the rendered masked watermarks are complemented in an attempt to satisfy the watermark threshold. In an example implementation, masked watermark complementation module 522 may be utilized to complement the masked watermarks.

Figure 7:
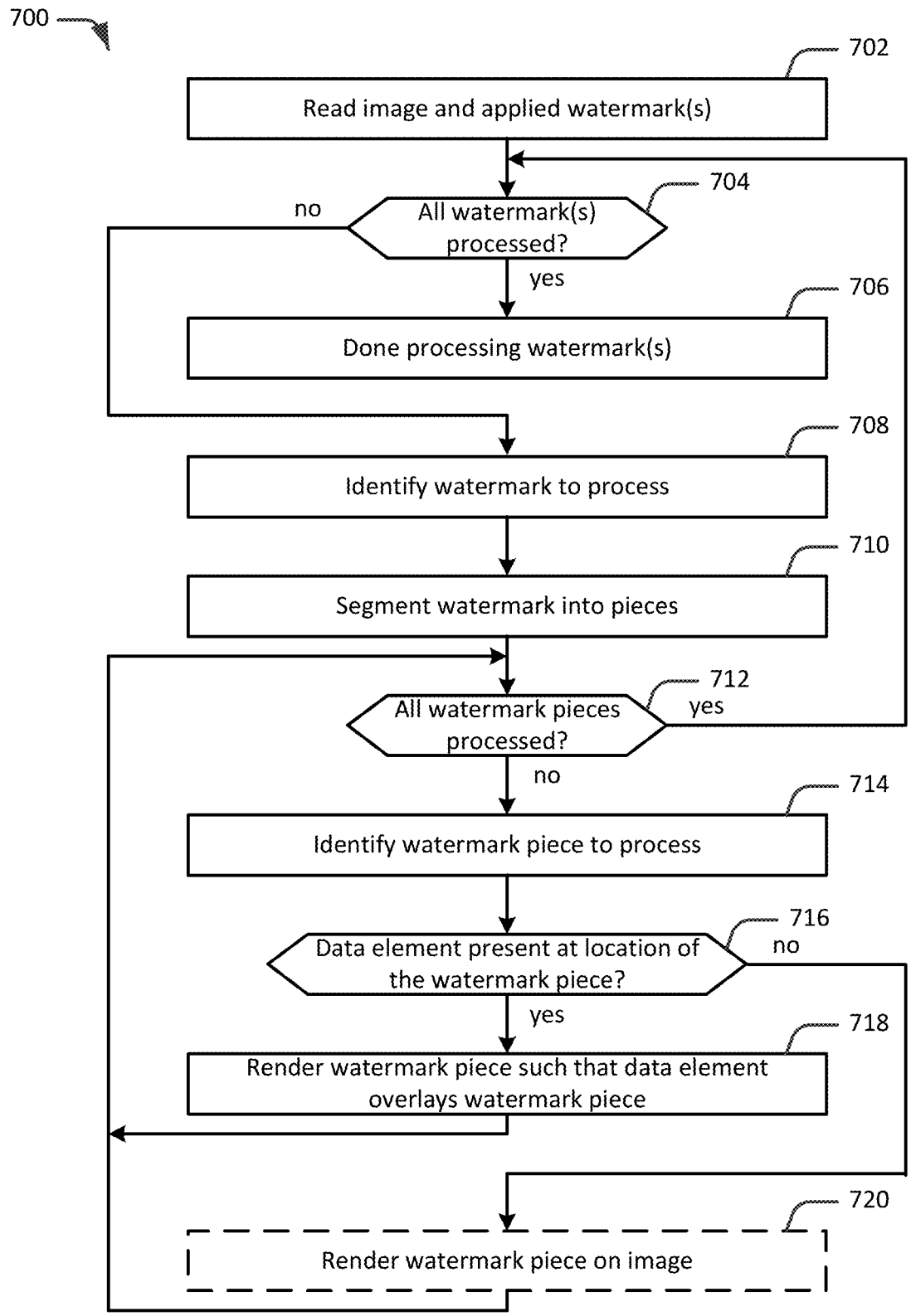
FIG. 7 is a flow diagram illustrating an example process for rendering a watermark by masking the watermark as necessary, in accordance with an embodiment of the present disclosure.

FIG. 7 is a flow diagram illustrating an example process 700 for rendering a watermark by masking the watermark as necessary, in accordance with an embodiment of the present disclosure. The operations of process 700 can be performed by masked watermark complementation module 522. At operation 702, the content and the applied watermarks in the content are read. For example, in an illustrative embodiment, reading content (e.g., an image) allows for detecting data elements and the locations of the data elements in the content, and reading the watermarks allows for determining the size or sizes of the watermarks and the locations of the watermarks in the content. At operation 704, a check is made to determine whether all the watermarks have been processed for rendering. If all the watermarks have been processed, then, at operation 706, the processing of the watermarks is complete. Otherwise, if all the watermarks have not all been processed, then, at operation 708, a watermark to process for rendering is identified. The identified watermark can be referred to as a current watermark (a current watermark being processed). At operation 710, the current watermark is segmented into multiple watermark pieces.

At operation 712, a check is made to determine whether all the watermark pieces of the current watermark have been processed. If all the watermark pieces of the current watermark have been processed, then, at operation 704, a check is made to determine whether all the watermarks have been processed for rendering, and the processing continues. Otherwise, if all the watermark pieces of the current watermark have not been processed, then, at operation 714, a watermark piece to process is identified. The identified watermark piece is a piece of the current watermark, and can be referred to as a current watermark piece (a current watermark being processed).

At operation 716, a check is made to determine whether a data element is present at the location in the content (e.g., a location in an image) at which the current watermark piece is to be rendered. If a data element is detected at the location at which the current watermark piece is to be rendered, then, at operation 718, the current watermark piece is rendered at that location such that the data element overlays the current watermark piece. Otherwise, if a data element is not detected at the location at which the current watermark piece is to be rendered, then, at operation 720, the current watermark piece is rendered at that location such that the current watermark piece overlays the content (e.g., the current watermark piece overlays the data element or a portion of the data element). In any cases, subsequent to processing the current watermark piece, at operation 712, a check is made to determine whether all the watermark pieces of the current watermark have been processed, and the processing continues.

Figure 8:
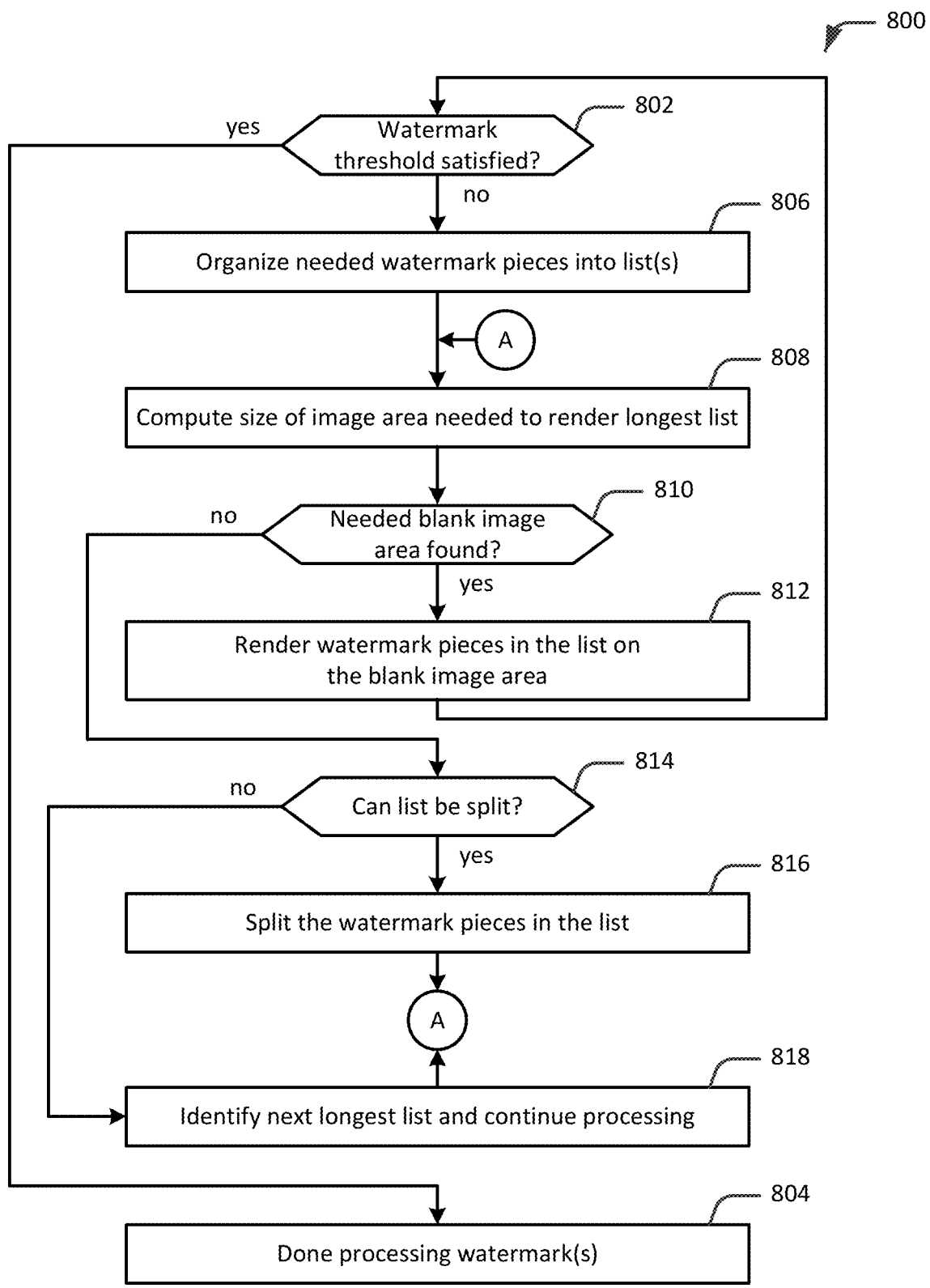
FIG. 8 is a flow diagram illustrating an example process for complementing a masked watermark, in accordance with an embodiment of the present disclosure.

FIG. 8 is a flow diagram illustrating an example process 800 for complementing a masked watermark, in accordance with an embodiment of the present disclosure. The operations of process 800 can be performed by masked watermark complementation module 522. At operation 802, a check is made to determine whether the specified watermark threshold is satisfied. In particular, a check is being made to determine whether sufficient complement watermarks have been rendered on the content, when combined with the rendered masked watermarks and the other rendered complete watermarks, to satisfy the specified watermark threshold. If the watermark threshold is satisfied, then the rendered complement watermarks are sufficient and, at operation 804, the processing completes. Otherwise, if the watermark threshold is not satisfied, then, at operation 806, the watermark pieces that are needed (e.g., the pieces of the rendered masked watermarks which were not rendered due to the presence of data elements) are organized into one or more organized lists. Here, each list includes the watermark piece or pieces needed to complement (i.e., complete) a particular rendered masked watermark. Thus, for example, in the case of two rendered masked watermarks, there would be two organized lists of needed watermarks.

At operation 808, the size of the content area (e.g., image area) needed to render the watermark pieces in the longest list is computed. In this example case, the lists of watermark pieces are being processed in an order beginning with the longest list. That is, an attempt is being made to render the watermark pieces in the longest list first. Note, however, that the lists of watermark pieces can be processed in any order. For example, in other embodiments, the lists of watermark pieces can be processed starting with the shortest list or in an arbitrary order. The longest list remaining to be processed can be referred to as a current list (a current list of watermark pieces being processed).

At operation 810, a check is made to determine whether there is sufficient blank area in the content in which to render the watermark pieces in the current list. In one embodiment, the same or similar techniques used to detect data elements in the content can be used to determine whether there is sufficient blank area in the content to render the watermark pieces in the current list. If such a blank area in the content is found, then, at operation 812, the watermark pieces in the current list are rendered on the identified blank area of the content as a complement watermark. Then, at operation 802, a check is made to determine whether the specified watermark threshold is satisfied, and the processing continues. Here, a check is being made to determine whether the just rendered complement watermark was sufficient, when combined with the rendered masked watermarks and the other rendered complete watermarks, to satisfy the specified watermark threshold.

Otherwise, if sufficient blank area in the content to render the watermark pieces in the current list is not found, then, at operation 814, a check is made to determine whether the current list can be split into multiple smaller lists. Here, since the needed blank area to render the watermark pieces in current list together (e.g., as a single piece) was not found (operation 810), an attempt is going to be made to render these watermark pieces in smaller chunks in distinct areas in the content instead of together in one area of the content. Note that there may be a limit as to how short (small) a list can be and/or the number of times a list can be split. For example, this limit may be specified in a configuration file that is accessible to an authorized user (such as a system administrator), and the user may tune or adjust the limit based on a desired level of performance.

If the current list can be split, then, at operation 816, the current list is split into multiple smaller lists. Note that the individual watermark pieces in the current list need not be maintained (preserved) when splitting the current list. That is, the current list can be split into multiple smaller lists without regard to the characteristics of the individual watermark pieces in the current list. Then, at operation 808, the size of the area needed to render the watermark pieces in the longest list is computed, and the processing continues. In this case, the longest list is the longest of the multiple smaller lists created by splitting the current list (operation 816).

Otherwise, if the current list cannot be split further (e.g., the current list has been split a pre-established number of times or the length of the current list is such that splitting the current list will create a smaller list that is shorter than a pre-established limit on the length), then, at operation 818, the next longest list of watermark pieces is identified, if possible, and the processing continues. Here, since the current list cannot be rendered on the content, even in smaller chunks (operation 814), an attempt is going to be made to render the watermark pieces in the next list (e.g., next longest list) to satisfy the watermark threshold. However, it may be the case that all the lists of needed watermark pieces have been processed and there will not be any further list to process. The result in this case is that the specified watermark threshold cannot be satisfied, and an error notification may be generated to inform of this result.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect, connecting, and coupling.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A method comprising:
    segmenting a watermark into a plurality of watermark pieces;
    for at least one watermark piece of the plurality of watermark pieces:
    determining a location within the content at which to apply the at least one watermark piece, and
    determining that a data element of content is present at the location within the content at which to apply the at least one watermark piece, and
    responsive to the determination of the data element of content being present at the location within the content at which to apply the at least one watermark piece, rendering the at least one watermark piece on the content as a masked watermark by overlaying the data element on the at least one watermark piece; and
    rendering one or more other watermark pieces of the plurality of watermark pieces visibly on the content when the at least one watermark piece is overlaid by the data element.

2. The method of claim 1, wherein the plurality of watermark pieces correspond to a first plurality of watermark pieces and the watermark is a first instance of an application of the watermark on the content, and the masked watermark is a first masked watermark, and the method further comprises:
    segmenting the watermark into a plurality of second watermark pieces; and
    for at least one watermark piece of the plurality of second watermark pieces, responsive to determination of a data element of the content being present at a location within the content at which to apply the at least one watermark piece of the plurality of second watermark pieces, rendering the at least one second watermark piece on the content such that the data element overlays the second watermark piece so as to render the second instance of the watermark as a second masked watermark.

3. The method of claim 1, further comprising, responsive to determination that a watermark threshold is not satisfied, rendering a complement watermark on the content, wherein the complement watermark corresponds to a portion of the watermark not included in the masked watermark.

4. The method of claim 3, wherein the complement watermark complements the masked watermark, such that the complement watermark and the masked watermark form a complete watermark.

5. The method of claim 2, further comprising:
    responsive to determination that a watermark threshold is not satisfied, rendering a complement watermark on the content, wherein the complement watermark corresponds to a portion of the watermark not included in the second masked watermark wherein the complement watermark complements the second masked watermark, such that the complement watermark and the second masked watermark form a complete watermark.

6. The method of claim 3, wherein the complement watermark is rendered in a blank area in the content.

7. The method of claim 3, wherein the complement watermark is rendered in a manner as to not overlay a data element in the content.

8. The method of claim 3, wherein the complement watermark includes a first complement watermark and a second complement watermark.

9. The method of claim 2, further comprising, responsive to determination that a watermark threshold is not satisfied, rendering a first complement watermark and a second complement watermark on the content.

10. The method of claim 9, wherein the first complement watermark complements the first masked watermark and the second complement watermark complements the second masked watermark.

11. The method of claim 9, wherein the first complement watermark complements the first masked watermark and the second complement watermark complements the first masked watermark.

12. A non-transitory machine-readable medium encoding instructions that when executed by one or more processors cause a process to be carried out for rendering a watermark on content, the process comprising:
  segmenting a watermark into a plurality of watermark pieces; for at least one watermark piece of the plurality of watermark pieces:
  determining a location within the content at which to apply the at least one watermark piece, and
  determining that a data element of content is present at the location within the content at which to apply the at least one watermark piece, and
  responsive to the determination of the data element of content being present at the location within the content at which to apply the at least one watermark piece, rendering the at least one watermark piece on the content as a masked watermark by overlaying the data element on the at least one watermark piece; and
  rendering one or more other watermark pieces of the plurality of watermark pieces visibly on the content when the at least one watermark piece is overlaid by the data element.

13. The non-transitory machine-readable medium of claim 12, wherein the process further comprises, responsive to determination that a watermark threshold is not satisfied, rendering a complement watermark on the content, wherein the complement watermark corresponds to a portion of the watermark not included in the masked watermark.

14. The non-transitory machine-readable medium of claim 13, wherein the complement watermark complements the masked watermark, such that the complement watermark and the masked watermark form a complete watermark.

15. The non-transitory machine-readable medium of claim 13, wherein the complement watermark is rendered in a manner as to not overlay a data element in the content.

16. A system comprising:
  a memory; and
  one or more processors in communication with the memory and configured to:
  segment a watermark into a plurality of watermark pieces;
  for at least one watermark piece of the plurality of watermark pieces:
  determine a location within the content at which to apply the at least one watermark piece,
  determine that a data element of content is present at the location within the content at which to apply the at least one watermark piece, and
  responsive to the determination of the data element of content being present at the location within the content at which to apply the at least one watermark piece, render the at least one watermark piece on the content as a masked watermark by overlaying the data element on the at least one watermark piece; and
  render one or more other watermark pieces of the plurality of watermark pieces visibly on the content when the at least one watermark piece is overlaid by the data element.

17. The system of claim 16, wherein the plurality of watermark pieces correspond to a first plurality of watermark pieces and the watermark is a first instance of an application of the watermark on the content, and the masked watermark is a first masked watermark, and the processor is further configured to:
  segment the watermark into a plurality of second watermark pieces; and
  for at least one watermark piece of the plurality of second watermark pieces, responsive to determination of a data element of the content being present at a location within the content at which to apply the at least one watermark piece of the plurality of second watermark pieces, render the at least one second watermark piece on the content such that the data element overlays the second watermark piece so as to render the second instance of the watermark as a second masked watermark.

18. The system of claim 16, wherein in response to a determination that a watermark threshold is not satisfied, the processor is further configured to render a complement watermark on the content, wherein the complement watermark corresponds to a portion of the watermark not included in the masked watermark.

19. The system of claim 18, wherein the complement watermark complements the first masked watermark, such that the complement watermark and the first masked watermark form a complete watermark.

20. The system of claim 17, wherein responsive to determination that a watermark threshold is not satisfied, the processor is further configured to render a complement watermark on the content, wherein the complement watermark corresponds to a portion of the watermark not included in the second masked watermark wherein the complement watermark complements the second masked watermark, such that the complement watermark and the second masked watermark form a complete watermark.

21. The method of claim 1, further comprising, responsive to determination that a threshold number of complete watermarks are not visible when the content is displayed, rendering a complement watermark at another location within the content where no data elements are present, wherein the complement watermark corresponds to a portion of the watermark not included in the masked watermark such that the complement watermark and the masked watermark form a complete watermark.

* * * * *